(12) United States Patent
Savry

(10) Patent No.: US 12,292,830 B2
(45) Date of Patent: May 6, 2025

(54) METHOD FOR MANAGING A CACHE MEMORY

(71) Applicant: COMMISSARIAT A L'ENERGIE ATOMIQUE ET AUX ENERGIES ALTERNATIVES, Paris (FR)

(72) Inventor: Olivier Savry, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 18/581,454

(22) Filed: Feb. 20, 2024

(65) Prior Publication Data

US 2024/0320151 A1 Sep. 26, 2024

(30) Foreign Application Priority Data

Mar. 21, 2023 (FR) ...................................... 23 02641

(51) Int. Cl.
*G06F 12/08* (2016.01)
*G06F 12/0811* (2016.01)
*G06F 21/60* (2013.01)

(52) U.S. Cl.
CPC ........ *G06F 12/0811* (2013.01); *G06F 21/602* (2013.01)

(58) Field of Classification Search
CPC .... G06F 12/0811; G06F 12/14; G06F 21/602; G06F 21/85; G06F 2212/1052; G06F 3/0623; G06F 3/0655; G06F 3/0679; G06F 3/0659; G06F 3/0619; G06F 3/0673; G11C 11/40611; G11C 11/40615; G11C 11/406; G11C 11/4078; G11C 11/40622; G11C 11/4094; G11C 11/22
See application file for complete search history.

(56) References Cited

U.S. PATENT DOCUMENTS

2015/0109871 A1\* 4/2015 Bains ................ G11C 11/40611
365/222
2016/0099043 A1\* 4/2016 Tu ..................... G11C 11/40615
365/222

(Continued)

OTHER PUBLICATIONS

Preliminary French Search Report issued Nov. 22, 2023 in French Application 23 02641 filed on Mar. 21, 2023, 8 pages (with English Translation of Categories of Cited Documents & Written Opinion).

(Continued)

*Primary Examiner* — Tracy C Chan
(74) *Attorney, Agent, or Firm* — Oblon, McClelland, Maier & Neustadt, L.L.P.

(57) ABSTRACT

This method comprises:
  selecting, depending on an address of a word to be read or written, a first cell in an indirection table and using, as first value generated for a line index, the value contained in this first cell, and
  in response to triggering of a cache miss:
    storing the word retrieved from a memory of higher rank in a new line identified by a second line-index value, this second value being contained in a second cell of the indirection table, and
    permutating, in the indirection table, only values contained in the first and second cells, so that after this permutation the first cell contains the second value and the second cell contains the first value.

13 Claims, 3 Drawing Sheets

(56) References Cited

U.S. PATENT DOCUMENTS

| | | | |
|---|---|---|---|
| 2018/0046808 A1* | 2/2018 | Cammarota | G06F 21/57 |
| 2022/0188024 A1* | 6/2022 | Brandl | G06F 3/0604 |
| 2022/0189532 A1* | 6/2022 | Nale | G11C 11/40611 |
| 2023/0047007 A1* | 2/2023 | Lovett | G11C 11/40615 |

OTHER PUBLICATIONS

Werner et al., "SCATTERCACHE: Thwarting Cache Attacks via Cache Set Randomization", 28$^{th}$ USENIX Security Symposium, 2019, 19 pages.

Purnal et al., "Advanced profiling for probabilistic Prime+Probe attacks and covert channels in ScatterCache", arXiv:1908.03383v1 [cs.CR], 2019, 8 pages.

Beierle et al., "The SKINNY Family of Block Ciphers and its Low-Latency Variant MANTIS", CRYPTO 2016, 53 pages.

Jaamoun et al., "Scramble Cache: An Efficient Cache Architecture for Randomized Set Permutation", Design, Automation & Test in Europe Conference & Exhibition, 2021, 7 pages.

Wang et al., "New Cache Designs for Thwarting Software Cache-based Side Channel Attacks", ISCA'07, 2007, 12 pages.

\* cited by examiner

METHOD FOR MANAGING A CACHE MEMORY

The invention relates to a method and unit for managing a cache memory of an electronic computer.

Cache memories are used to allow a process executed by a microprocessor to more rapidly access information initially stored in the main memory.

In this patent application, by "process" what is meant is a program as well as a routine of this program or any other software executed by the computer and capable of reading from or writing to the cache memory.

The state of the cache memory is highly dependent on the addresses that have been accessed by the one or more processes executed by the computer. Moreover, the state of the cache memory at a given time may be quite easily observed by a third-party process executed by the computer or simply by measuring cache-memory access times.

These characteristics of a cache memory have been exploited to develop attacks known as side-channel attacks. These attacks make it possible to reveal secret information processed by an executed process or to modify operation of the executed process with a view to circumventing security measures. For example, one type of secret information is a cryptographic key used to encrypt or decrypt information. A security measure is, for example, entry of a PIN code.

To do this, side-channel attacks observe the state of the cache memory while the attacked process is executing so as to determine the one or more addresses accessed by this attacked process. The accessed addresses depend on secret data processed by the attacked process. Thus, knowing the addresses accessed by the attacked process makes it possible to obtain information on these secret data. In general, these attacks involve execution of an attacking process in parallel with the attacked process. This attacking process must be able to access specific addresses of the cache memory. This is notably the case for the type of attack known as "Prime & Probe".

To increase the robustness of the cache memory against this type of attack, it has been proposed to randomly scatter the lines of the cache memory accessed by a process. This is known as spatial randomization.

One such spatial-randomization solution that is particularly effective is described in the following article: M. Werner, T. Unterluggauer, L. Giner, M. Schwarz, D. Gruss, and S. Mangard, "SCATTERCACHE: Thwarting Cache Attacks via Cache Set Randomization", *USENIX Security Symposium*, 2019, pages 675-692. Below, the term "Scattercache" is used to refer to this solution.

More precisely, this article teaches that when a first process seeks to read a word at an address @r, it transmits a request to the cache memory. This request contains the address @r. The address @r contains an address $@_{Si,r}$ of a set $S_{i,r}$ of lines of the cache memory that are likely to contain the sought word. This address $@_{Si,r}$ is often referred to as a set or index. In the Scattercache solution, the address $@_{Si,r}$ is transmitted to a cryptographic IDF function that constructs, notably from the address $@_{Si,r}$, the values of W line indices $Iw_1$ to $Iw_W$, where W is an integer greater than one. Each index $Iw_j$ points to one respective way $W_j$, where the subscript j is an identifier of way $W_j$. The subscript j is here an integer comprised between 1 and W. Each way $W_j$ contains s distinct lines of the cache memory. The ways $W_j$ are distinct from one another, i.e. they have no lines in common. The value of the index $Iw_j$ uniquely identifies one line of way $W_j$. The set $S_{i,r}$ is composed only of the W lines identified by the values of the W indices $Iw_j$ constructed by the IDF function.

If the sought word is not found in this set $S_{i,r}$ of lines, then this causes a cache miss. In the event of a cache miss, a set of new lines containing the sought word is loaded into the cache memory from the main memory of the electronic computer. The new loaded lines are saved in place of the previous lines of the set $S_{i,r}$.

Due to the organization into distinct ways, and by virtue of use of different indices $Iw_j$ to point to each way $W_j$, the lines of the set $S_{i,r}$ are not located next to one another in the cache memory and are not located in the same location in each of the ways $W_j$. This allows much greater spatial randomization. Thus, the observation of the state of the cache memory, and in particular of the set $S_{i,r}$, by an attacking process is more difficult.

In addition, the cryptographic IDF function is parameterized by a secret key k that it is possible to modify. This key k is managed by a hardware module of the computer, which guarantees its confidentiality. However, in practice, it is not possible to modify the key k during execution of a process. This is because, after modification of the key k, for a given received address $@_{Si,r}$, the values constructed for each of the indices $Iw_j$ are different from those constructed for the same address $@_{Si,r}$ and for the same process before modification of the key k. In other words, after modification of the key k, the address $@_{Si,r}$ corresponds to a new set $S'_{i,r}$ of lines and no longer to the set $S_{i,r}$. Therefore, when the set $S'_{i,r}$ is first accessed after modification of the key k, the word which the process wishes to access is not found in this set $S'_{i,r}$, which systematically causes a cache miss. In addition, this cache miss systematically occurs for all the executed processes and for all possible addresses $@S_{i,r}$. Thus, modifying the key k during execution of a process triggers a very large number of cache misses, which slows down process execution substantially. To avoid this problem, the Scattercache solution proposes to change the key k only when the computer is switched on.

In the Scattercache solution, the values of the indices $Iw_j$ are also computed using an SDID identifier. Unlike the key k, the SDID identifier is managed by a software module. Thus, the security of this SDID identifier is lower than that of the key k. In addition, similarly to what was explained in the case of modification of the key k, modification of the SDID identifier triggers a large number of cache misses. Therefore, just like the key k, in practice, the SDID identifier cannot be frequently changed.

Due to the above limitations of the Scattercache solution, with this solution spatial randomization is static or practically static during the execution of a process. Therefore, an attacking process may still identify the cache lines used by an attacked process.

The invention aims to provide a method for managing the cache memory of an electronic computer that is more robust than the Scattercache solution.

The invention is set out in the attached set of claims.

The invention will be better understood on reading the following description, which is given solely by way of non-limiting example, with reference to the drawings, in which.

In these figures, the same references have been used to designate elements that are the same. In the rest of this description, features and functions that are well known to those skilled in the art will not be described in detail.

In this description, detailed examples of embodiments are first described in Section I with reference to the figures. Subsequently, in Section II, variants of these embodiments are introduced. Lastly, the advantages of the various embodiments are discussed in Section III.

SECTION I: EXAMPLE OF EMBODIMENT

Figure 1:
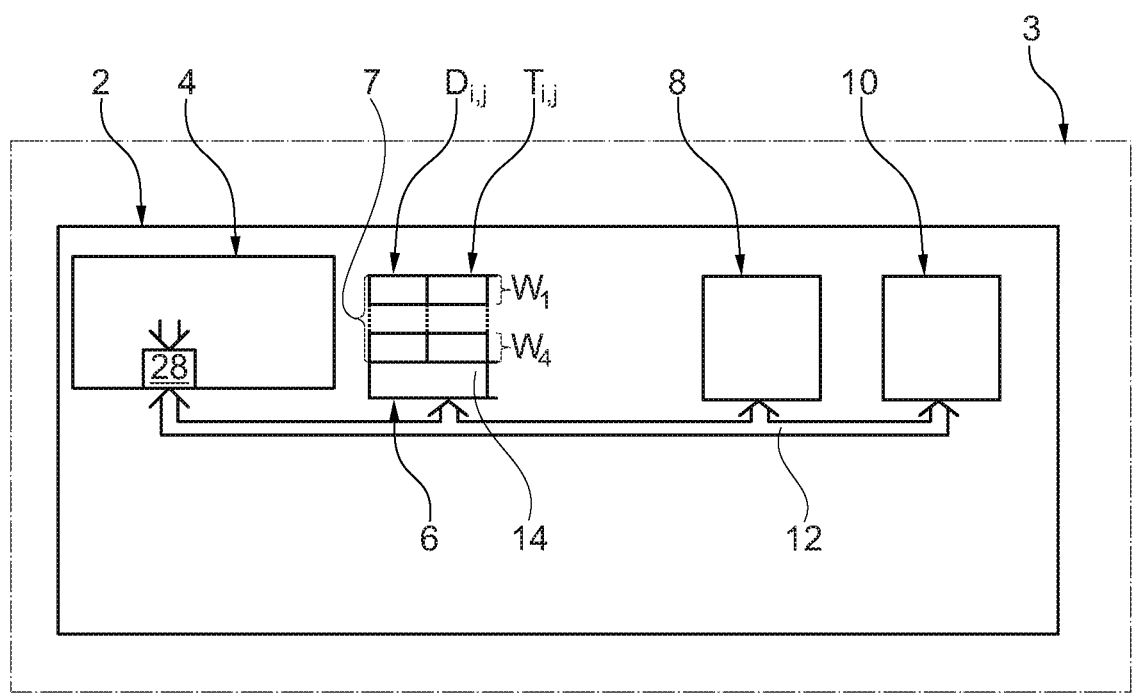
FIG. 1 is a schematic illustration of the architecture of an electronic computer equipped with a cache memory.

FIG. 1 schematically shows the architecture of an electronic computer 2. This computer 2 is typically integrated into a larger system 3 at least part of the operation of which it commands and controls. The system 3 is for example a desktop system unit, a mobile telephone, a smartphone or any other electronic device operation of which is controlled, at least in part, by the computer 2.

Conventionally, the computer 2 comprises:
at least one microprocessor 4,
a cache memory 6,
a main memory 8,
mass storage 10, and
data buses 12 connecting these various components of the computer 2 to one another.

The cache memory 6 is typically faster than the main memory 8, which itself is faster than the mass storage 10. The speed of a memory corresponds to the access time required to access information stored in this memory. Currently, the access time of a cache memory is typically less than 30 ns or 20 ns and, generally, greater than 1 ns. At the present time, the access time of a main memory is typically less than 500 ns or 100 ns and, generally, greater than 30 ns or 50 ns. At the present time, the access time of mass storage is typically greater than 1 µs or 10 µs and, generally, less than 10 ms.

Typically, the size of a memory of the computer 2 decreases as the speed of the memory increases. Thus, the cache memory 6 is smaller in size than the main memory 8, which itself is smaller in size than the mass storage 10. The size of a memory is expressed in bytes. The size of the cache memory 6 is, for example, less than 4 MB and usually greater than 60 kB. The size of the main memory 8 is usually greater than 256 MB or 1 GB and, generally, less than or equal to 16 GB or 32 GB. The size of the mass storage 10 is for its part usually greater than 4 GB or 1 TB.

Here, the memories of the computer 2 are classified in order of increasing access time. Thus, below, the expression "memory of higher rank" designates a memory the access time of which is greater than that of the current memory.

Generally, the memories 6 and 8 are volatile random-access memories. For example, the memory 6 is a static random-access memory (SRAM). The main memory 8 is for example a dynamic random-access memory (DRAM).

The mass storage 10 is generally a non-volatile memory. Many different technologies for producing such mass storage exist. For example, the memory 10 may be, inter alia: a magnetic tape; a hard disk; an optical disk such as a CD, a DVD or a blu-ray disk; a magneto-optical disk; a flash memory; or a solid-state drive (SSD).

The memory 10 for example contains a backup copy of the binary code of the processes to be executed by the microprocessor 4. The memory 10 may also contain copies of the data to be processed by the various processes capable of being executed by the microprocessor 4. Typically, the binary code of the processes and the data to be processed are, for example, loaded into the memory 8 from the memory 10 when the computer 2 is switched on and/or in response to a command to reset the computer 2 or when execution of a new process by the computer 2 is triggered.

The memory 6 may be a memory external to the microprocessor 4, as shown in FIG. 1. In this case, the memory 6 is, for example, formed on a substrate that is mechanically separate from the substrate on which the various elements of the microprocessor 4 are formed.

To simplify the description, here the memory 6 is considered to comprise a single cache-memory level, i.e. typically the level known as "L1 cache". However, those skilled in the art will be able to transpose all that is described below in this particular case to the case of cache memories having a plurality of cache-memory levels.

Below, in the absence of any indication to the contrary, the term "word" designates i) an instruction or part of an instruction of the binary code of a process executable by the microprocessor 4 or ii) a datum or part of a datum corresponding to an operand on which an instruction executed by the microprocessor 4 operates.

The cache memory 6 serves as intermediate storage between the main memory 8 and the microprocessor 4. Instead of directly accessing the main memory 8, which has a high latency, the microprocessor 4 will first of all look to see whether the word is present in the cache memory. The following two scenarios are then possible:

Scenario 1): The word is present in the cache memory 6, this corresponding to what is known as a hit or cache hit. In this case, the word is transferred directly to the microprocessor 4 from the cache memory 6. The memories of higher rank than the memory 6 are then not accessed to obtain this word.

Scenario 2): The word is absent from the cache memory 6. This scenario corresponds to what is known as a miss or cache miss. In this case, the cache memory must search a memory of higher rank, i.e. here typically the main memory 8, for the absent word. This scenario is here called a "cache miss". The cache miss therefore naturally leads to a longer time being taken to access the sought word.

In this embodiment, the cache memory 6 is a W-way associative memory. In this case, the integer W is greater than or equal to two and generally less than 128 or 64 or 16.

The cache memory 6 typically comprises a data storage medium 7. The medium 7 is divided into a plurality of lines $L_{i,j}$ of fixed length. Each line comprises a data field $D_{i,j}$. Each field $D_{i,j}$ is divided into $N_m$ words of fixed length. The lengths of a word, of a field, and of a line are expressed by the number of their constituent bits. For example, the length of a word is typically equal to 32 bits or 64 bits. Below, the description is given in the particular case where the length of a word is equal to 32 bits. Each field $D_{i,j}$ comprises an identical number of words. For example, here, each field $D_{i,j}$, comprises four words. Thus, the length of the field $D_{i,j}$ is 128 bits.

The lines of the cache memory 6 are distributed between W ways $W_j$, where W is an integer greater than one. Here, each way $W_j$ contains s lines of cache memory 6, where s is an integer equal to T/(W·L), where:

T is the size of the cache memory 6 expressed in bytes,
L is the number of bytes per line,
W is the number of ways, and
the symbol "·" designates the operation of scalar multiplication.

By way of illustration, the remainder of this description is given in the particular case where W is equal to four. To simplify FIG. 1, only ways $W_1$ and $W_4$ have been shown. In this figure, the lines that have not been shown have been represented by dashes. The subscript j is an identifier of way $W_j$. The subscript j is comprised between 1 and W. Lines $L_{i,j}$ are all contained in way $W_j$. The ways $W_j$ are distinct from one another, i.e. any given line of the cache memory 6 is contained in only one of these ways $W_j$.

The lines of the cache memory 6 are also grouped into distinct sets $S_i$, where the subscript i is an identifier of set $S_i$ among all the other sets of lines used. These sets $S_i$ are also known as indices. Each set $S_i$ contains W lines $L_{i,j}$ with each of the lines $L_{i,j}$ contained in one respective way $W_j$. Thus, line $L_{i,j}$ is a line of the cache memory 6 that belongs both to set $S_i$ and to way $W_j$.

Each set $S_i$ in the cache memory 6 corresponds in a one-to-one manner to an address $@_{Si}$ called the "line set address". There are therefore here s different line set addresses $@_{Si}$. Below, the minimum number of bits required to encode the address $@_{Si}$ of a set $S_i$ is, for example, equal to five, and hence s is equal to $2^5$.

The position of a particular word in the field $D_{i,j}$ is given by an index "$d_r$" that identifies the position of a word in the line $L_{i,j}$. The index $d_r$ is a number comprised between 1 and $N_m$. Typically, the words of a given field $D_{i,j}$ are placed immediately one after another.

In addition to the field $D_{i,j}$, each line $L_{i,j}$ comprises a line tag $T_{i,j}$. The tag $T_{i,j}$ contains a value that allows the line $L_{i,j}$ containing the sought word to be unambiguously selected from the W lines $L_{i,j}$ of the set $S_i$. To this end, the tag $T_{i,j}$ is constructed from the bits of the address @r of the sought word that have not already been used to determine the address $@_{Si}$ of the set $S_i$ likely to contain the line $L_{i,j}$ and to determine the index $d_r$. For example, a hash function may be applied to these bits of the address of the sought word to obtain the tag $T_{i,j}$.

The cache memory 6 also comprises an electronic managing unit 14. This unit 14 is notably configured to:
  in response to a request to read a word from the cache memory 6, send the sought word to the sender of the request if this word has been found in the cache memory 6, and if not trigger a cache miss; and
  in response to a request to write a word to the cache memory 6, replace the old value of this word stored on the medium 7 with its new value, and in the case where the word to be written could not be found in the cache memory 6, trigger a cache miss.

For example, when the unit 14 triggers a cache miss, it sends a request to a memory of higher rank, typically here the main memory 8, to trigger loading, into the cache memory 6, of the sought word. The unit 14 then manages storage, in a line $L_{i,j}$, of the word supplied in response to its request.

By way of illustration, the microprocessor 4 has a RISC architecture (RISC standing for Reduced Instruction Set Computer). The microprocessor 4 comprises, notably, an input/output interface 28 for data.

The interface 28 makes it possible to read words from the memory 6 and, alternately, to write words to the memory 6. Here, to read a word, the microprocessor 4 generates and sends via the interface 28 a request to read this word. This read request notably comprises a physical or virtual address @r of the word to be read. The virtual address of a word is the address of this word in the memory space of the process executed by the microprocessor 4. This virtual address corresponds to a physical address in the main memory 8 where the sought word is stored. Conventionally, an MMU (acronym of Memory Management Unit) is tasked with converting virtual addresses into physical addresses at the moment when this becomes necessary.

To this end, the @r address comprises:
  an address $@_{Si,r}$ of a set $S_{i,r}$ of the cache memory 6 likely to contain the sought word;
  an index $d_r$ that identifies the position of the sought word in the field $D_{i,j}$ of the W lines $L_{i,j}$ of the set $S_{i,r}$ identified by the address $@_{Si,r}$; and
  a tag $T_r$ that makes it possible to unambiguously select, from the W lines $L_{i,j}$ of the set $S_{i,r}$ corresponding to the address $@_{Si,r}$, the line that contains the sought word if this line exists.

The tag $T_r$ is typically constructed by implementing the same algorithm as that used to construct each of the tags $T_{i,j}$ stored in the cache memory 6. Thus, if one of the lines $L_{i,j}$ of the set $S_{i,r}$ contains the sought word, its tag $T_{i,j}$ is identical to the tag $T_r$. This makes it possible to identify it unambiguously as being the line that contains the sought word among the W lines $L_{i,j}$ of the set $S_{i,r}$.

In this embodiment, the write and read requests received by the cache memory 200 in addition comprise:
  an identifier $Id_u$ of the process executed by the microprocessor 4 that issued this request, and
  a shared memory marker MP that indicates whether or not the sought word is shared with other processes simultaneously executed by the computer 2.

Typically, the identifier $Id_u$ is a PID (acronym of Process IDentifier) assigned to any process executed by the microprocessor 4. For example, the identifier $Id_u$ is the type of process identifier known as an ASID (acronym of Address Space IDentifier).

The marker MP may adopt an active state and an inactive state. In the active state, it indicates that the word to be accessed is shared between a plurality of processes simultaneously executed by the computer 2. A shared word is a given word that may be read and/or written by a plurality of different processes. In the inactive state, the marker MP indicates that the word to be read or written is only used by the process that generated the request.

A request to write a word to the memory 6 is, for example, practically identical to the read request except that it in addition comprises a digital value $V_r$ containing the new value of the word to be stored in the cache memory 6.

Figure 2:
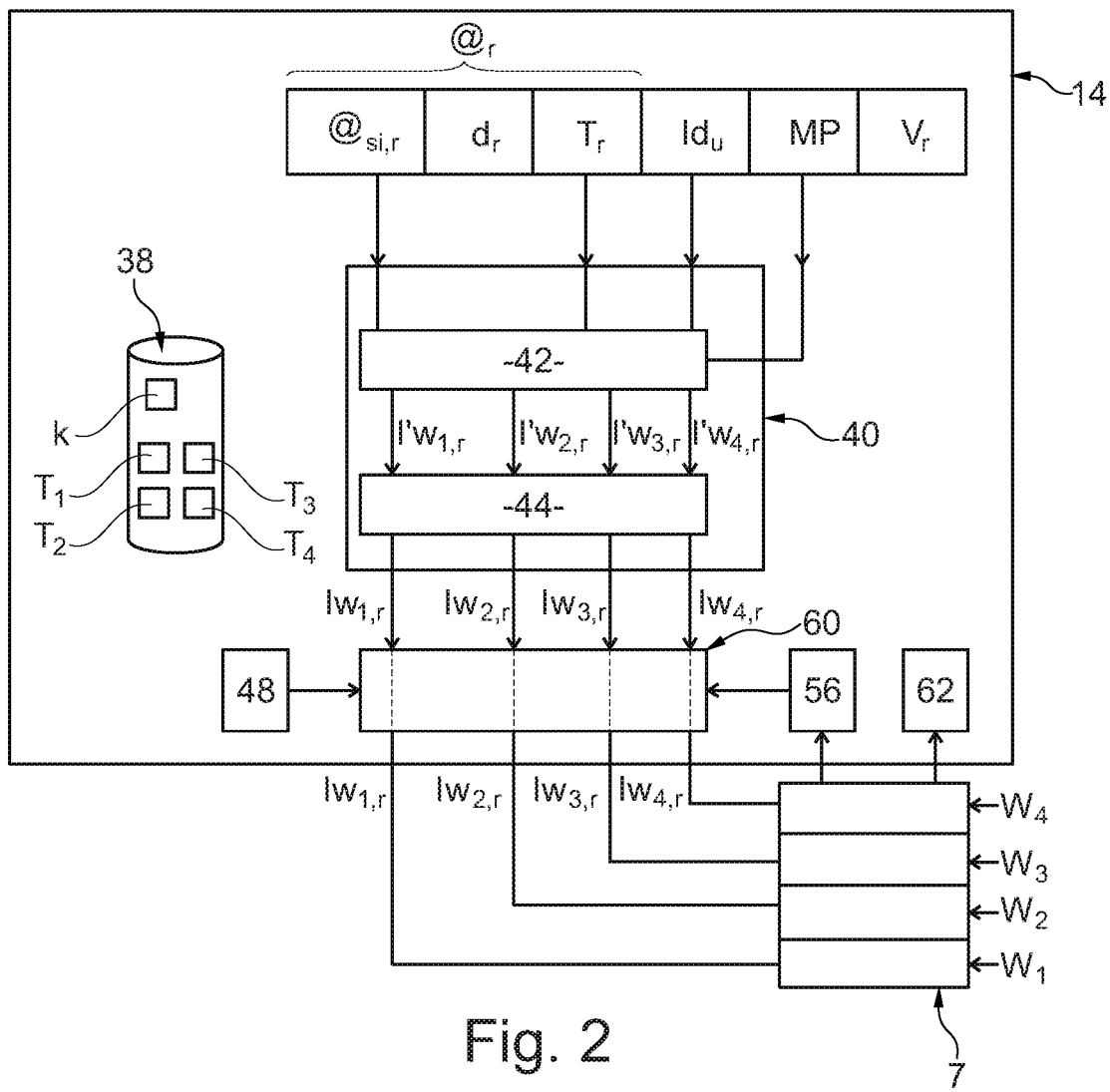
FIG. 2 is a schematic illustration of a unit for managing the cache memory of the computer of FIG. 1.

FIG. 2 shows in greater detail the unit 14 for managing the cache memory 6. The unit 14 is configured to implement the managing method described in greater detail with reference to FIG. 5.

The unit 14 comprises registers in which the various data contained in the read or write request received by the memory 6 are stored. In this figure, the registers containing the tag $T_r$, the address $@_{Si,r}$, the index $d_r$, the identifier $Id_u$, the marker MP and the value $V_r$ have been designated by the references $T_r$, $@_{Si,r}$, $d_r$, $Id_u$, MP and $V_r$, respectively.

The unit 14 comprises a memory 38 and a hardware generator 40 of values $Iw_{j,r}$ for each of the indices $Iw_j$ corresponding to the received address @r.

Typically, the memory 38 is accessible only by the components of the unit 14. Preferably, the memory 38 is a non-volatile memory. In particular, the information contained in the memory 38 cannot be read or written by processes executed by the microprocessor 4. Here, this memory 38 comprises a cryptographic key k and W indirection tables $T_j$. Here, each indirection table $T_j$ is uniquely associated with a respective index, i.e. here with the index $Iw_j$. Therefore, in this example of embodiment, the memory 38 comprises four tables $T_1$ to $T_4$ for the indices $Iw_1$ to $Iw_4$, respectively. The structures of all tables $T_j$ are identical.

The generator 40 executes a bijective correspondence function that associates, with each address $@_{Si,r}$, one and only one group of W values $Iw_{j,r}$. This group of values $Iw_{j,r}$ corresponds to the set $S_{i,r}$ since each value $Iw_{j,r}$ uniquely identifies one of the lines of the set $S_{i,r}$.

The generator 40 receives, as input, the address $@_{Si,r}$. In addition, in this embodiment, it also receives as input the tag $T_r$, the identifier $Id_u$ and the marker MP. As output, it returns, on a respective output, each of the generated values $Iw_{j,r}$. To this end, the generator 40 has W outputs. Here, the value $Iw_{j,r}$ of each index $Iw_j$ is comprised between 1 and s. The value $Iw_{j,r}$ therefore corresponds directly to the number of line $L_{i,j}$ in table $T_j$.

Here, the generator 40 notably comprises, to this end, a cryptographic circuit 42 and a conversion circuit 44.

When the marker MP indicates that the word is not shared, the cryptographic circuit 42 generates four intermediate values $I'w_{j,r}$ depending on the address $@_{Si,r}$, on the tag $T_r$, on the identifier $Id_u$ and on the key k contained in the memory 38. Conversely, when the marker MP indicates that the word is shared, the cryptographic circuit 42 generates four intermediate values $I'w_{j,r}$ depending on the address $@_{Si,r}$ and on the key k but does not take into account the identifier $Id_u$ and, optionally, the tag $T_r$. Each intermediate value $I'w_{j,r}$ is an integer comprised between one and s.

The circuit 44 converts each intermediate value $I'w_{j,r}$ into a final value $Iw_{j,r}$ that is delivered to the corresponding output of the generator 40. To this end, the circuit 44 uses the indirection tables $T_j$ stored in the memory 38. More precisely, the circuit 44 uses the intermediate value $I'w_{j,r}$ as line number to select a line of the table $T_j$ and then extracts the corresponding final value $Iw_{j,r}$ from the selected line.

The unit 14 also comprises the following components:
- a random or pseudo-random generator 48 of an integer comprised between 1 and s,
- a comparator 56,
- a controller 60, and
- a word extractor 62.

The comparator 56 compares the received tag $T_r$ to the tags $T_{i,j}$ of the lines of the set $S_{i,r}$ selected using the address $@_{Si,r}$. If one of the tags $T_{i,j}$ of the selected set $S_{i,r}$ corresponds to the tag $T_r$, then a selection signal allowing this line $L_{i,j}$ to be selected as the one containing the sought word is generated. This selection signal therefore corresponds to the case of a hit. In the contrary case, i.e. when none of the tags $T_{i,j}$ of the selected set $S_{i,r}$ corresponds to the tag $T_r$, a cache-miss signal is generated. A tag $T_{i,j}$ corresponds to the tag $T_r$ if these two tags are identical.

The selection signal and, alternately, the cache-miss signal is received by the controller 60.

In parallel with the comparator 56, the extractor 62 extracts from the field $D_{i,j}$ of the line $L_{i,j}$ that is currently being processed by the comparator 56, the word located at the position identified by the received index $d_r$.

Notably, the controller 60 is configured to:
- select the W lines $L_{i,j}$ of the set $S_{i,r}$ corresponding to the address $@_{Si,r}$ based on the values $Iw_{j,r}$ generated by the generator 40,
- if one of the W lines $L_{i,j}$ selected triggers a hit signal, then the controller 60 triggers, in response, in the case of a read request, transmission of the extracted word, and, in the case of a write request, writing of the received value $V_r$ to the word location in the position identified by the index $d_r$ in the field $D_{i,j}$ of this line, and
- load from the main memory 8 and store in the cache memory 6 the word corresponding to the address @r contained in the received request if this word could not be found in the cache memory 6.

Figure 3:
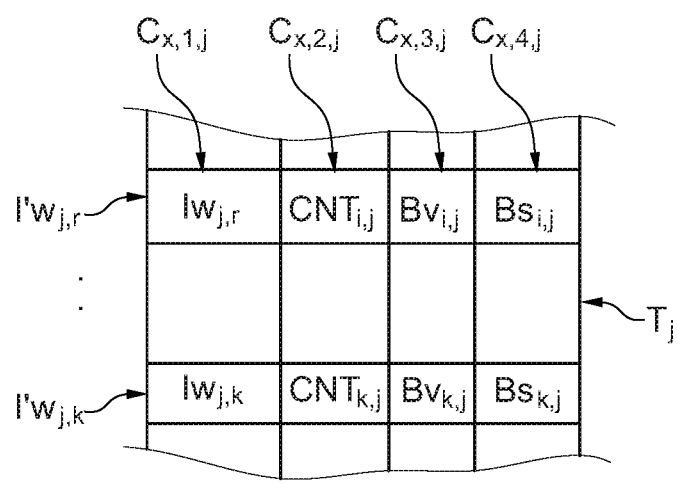
FIG. 3 is a schematic illustration of the structure of an indirection table used by the managing unit of FIG. 2.

The structure of the table $T_j$ is shown in FIG. 3. The table $T_j$ has four columns and as many lines as there are possible values of the index $Iw_j$. Here, it therefore has s lines numbered from 1 to s. The intersection between a column and a line forms a cell. Each cell is able to contain one value. Thus, each line of the table $T_j$ comprises four cells $C_{x,y,j}$, where the subscripts x and y are the numbers of the line and of the column of the table $T_j$, respectively. The subscript x varies from 1 to s and the subscript y varies from one to four. To simplify FIG. 3, only two lines corresponding to the line numbers $I'w_{j,r}$ and $I'w_{j,k}$ respectively have been shown.

The first column of the table $T_j$, i.e. the one that contains all the cells $C_{x,1,j}$, contains all the possible values of the index $Iw_j$. Here, these possible values are the integer values running from one to s. Thus, each cell $C_{x,1,j}$ comprises one of these values. For example, here, the cells $C_{x,1,j}$ of lines $I'w_{j,r}$ and $I'w_{j,k}$ contain the values $Iw_{j,r}$ and $Iw_j$,k of the index $Iw_j$, respectively.

The second column of the table $T_j$ contains all the cells $C_{x,2,j}$. Each cell $C_{x,2,j}$ contains a counter $CNT_{i,j}$ associated with the line $L_{i,j}$ identified by the value of the index $Iw_j$ contained in the cell $C_{x,1,j}$ located on the same line.

The third column of the table $T_j$ contains all the cells $C_{x,3,j}$. Each cell $C_{x,3,j}$ contains a validity bit $Bv_{i,j}$ associated with the line $L_{i,j}$ identified by the value of the index $Iw_j$ contained in the cell $C_{x,1,j}$ located on the same line. This bit $Bv_{i,j}$ makes it possible to mark the line $L_{i,j}$ as being valid or invalid. Conventionally, a line $L_{i,j}$ marked as invalid must be treated as if it contained no words. Thus, a line $L_{i,j}$ marked as invalid is intended to be erased and replaced as a priority by another line loaded from the main memory 8. Here, when the line $L_{i,j}$ is valid, the bit $Bv_{i,j}$ is equal to "1". Conversely, the bit $Bv_{i,j}$ is equal to "0" when the line $L_{i,j}$ is invalid.

The fourth column of the table $T_j$ contains all the cells $C_{x,4,j}$. Each cell $C_{x,4,j}$ contains a dirty bit $Bs_{i,j}$ associated with the line $L_{i,j}$ identified by the value of the index $Iw_j$ contained in the cell $C_{x,1,j}$ located on the same line. The bit $Bs_{i,j}$ makes it possible to mark this line $L_{i,j}$ as having been modified. When a line $L_{i,j}$ is marked as having been modified, the field $D_{i,j}$ that it contains is copied to the main memory 8 before, for example, this line is marked as invalid or removed from the cache memory 6. Here, when the line $L_{i,j}$ has been modified, the bit $Bs_{i,j}$ is equal to "1". Conversely, the bit $Bs_{i,j}$ is equal to "0" when the line $L_{i,j}$ has not been modified.

Figure 4:
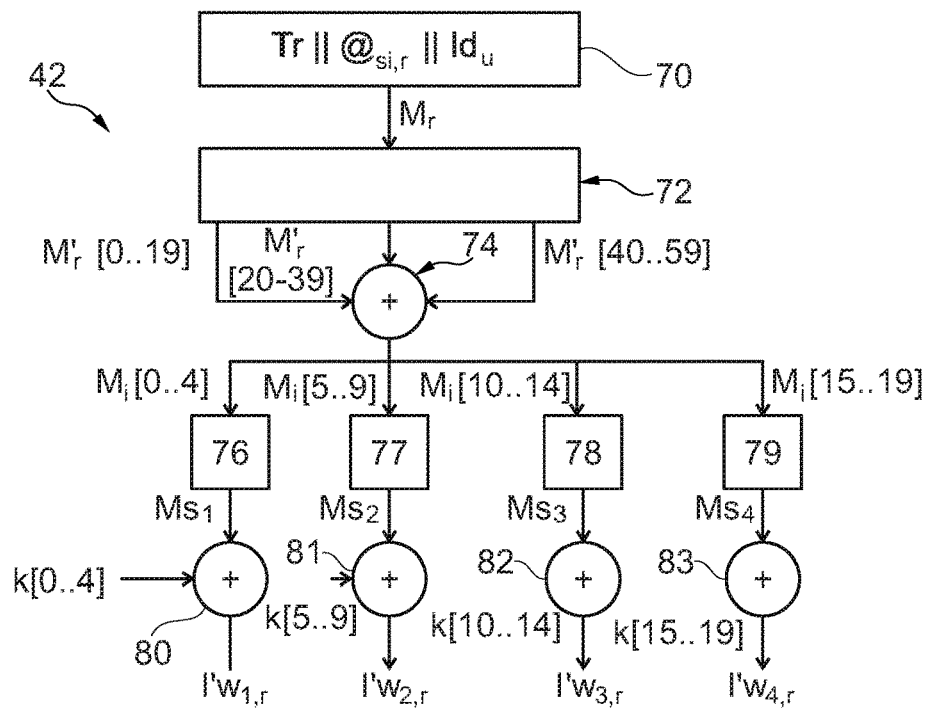
FIG. 4 is a schematic illustration of the architecture of a cryptographic circuit implemented in the managing unit of FIG. 2.

FIG. 4 shows in greater detail one possible embodiment of the circuit 42 in the case where the marker MP is in its inactive state. In this embodiment, the circuit 42 comprises a concatenation circuit 70, a permutator 72, an "exclusive-OR" logic circuit 74, four substitution circuits 76 to 79 and four "exclusive-OR" logic circuits 80 to 83.

The circuit 70 receives as input the tag $T_r$, the address $@_{Si,r}$ and the identifier $Id_u$ and delivers, as output, a word $M_r$ formed by concatenation of the bits of the tag $T_r$, of the address $@_{Si,r}$ and of the identifier $Id_u$. For example, here the tag $T_r$, the address $@_{Si,r}$ and the identifier $Id_u$ are encoded on 39 bits, 5 bits and 16 bits, respectively. Thus, the formed word $M_r$ comprises 60 bits.

The permutator 72 permutates the bits of the word $M_r$ to obtain a word $M'_r$, then sends the first twenty bits $M'_r[0 \ldots 19]$ of the word $M'_r$ to a first input of the circuit 74, the next twenty bits $M'_r[20 \ldots 39]$ of the word $M'_r$ to a second input of the circuit 74 and the last twenty bits $M'_r[40 \ldots 59]$ of the word $M'_r$ to a third input of the circuit 74.

The circuit 74 performs an "exclusive OR" or XOR between the bits $M'_r[0 \ldots 19]$, $M'_r[20 \ldots 39]$ and $M'_r[40 \ldots 59]$ to obtain a word $M_t$ encoded on twenty bits.

The first five bits $M_t[0 \ldots 4]$ are sent to an input of the circuit 76, the next five bits $M_t[5 \ldots 9]$ to an input of the circuit 77, the next five bits $M_t[10 \ldots 14]$ to an input of the circuit 78 and the last five bits $M_t[15 \ldots 19]$ to an input of the circuit 79.

The circuits 76 to 79 substitute the bits received as input with other bits to generate four words $Ms_1$ to $Ms_4$ that are each transmitted to a first input of the circuits 80 to 83, respectively. For example, each circuit 76 to 79 is an S-box.

The circuits 80 to 83 receive, on a second input, the first five bits $k[0 \ldots 4]$, the next five bits $k[5 \ldots 9]$, the next five bits $k[10 \ldots 14]$ and the last five bits $k[15 \ldots 19]$ of the key k, respectively.

The circuits 80 to 83 each perform an "exclusive OR" or XOR and deliver, to their outputs, the intermediate values $I'w_{1,r}$, $I'w_{2,r}$, $I'w_{3,r}$ and $I'w_{4,r}$, respectively.

Figure 5:
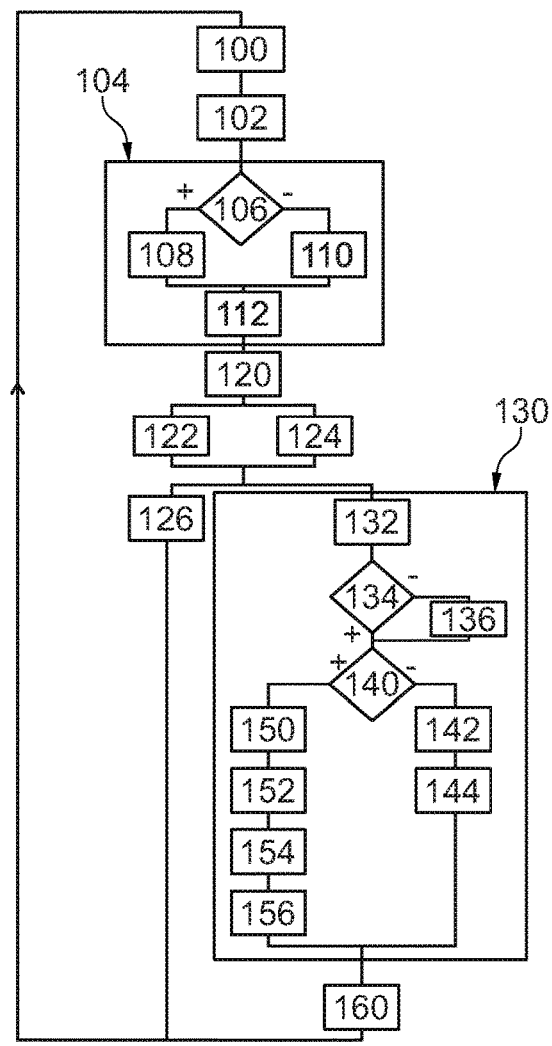
FIG. 5 is a flowchart of a method for managing the cache memory of the computer of FIG. 1.

Operation of the computer 2 and of the cache memory 6 will now be described with reference to the method of FIG. 5.

When the computer 2 is switched on, all the lines of the cache memory 6 are marked as being invalid using the bit $Bv_{i,j}$. To do this, the value "0" is written to all of the cells $C_{x,3,j}$ of all the tables $T_j$. For example, on first use of the computer 2, numerical values from 1 to s are stored in the cells $C_{x,1,j}$ of each table $T_j$, respectively. In other words, at the beginning of the first use of the computer 2, the value x is stored in cell $C_{x,1,j}$. On subsequent uses, the content of the cells $C_{x,1,j}$ is, for example, the content stored at the end of the preceding use. Thus, on subsequent uses, the values from 1 to s are not necessarily stored in the cells $C_{x,1,j}$ in increasing order of the subscripts x.

After the computer 2 has been switched on, execution of at least one process is triggered. The computer 2 here has the capacity to execute a plurality of processes simultaneously. To this end, for example, the computer 2 executes an operating system that allows simultaneous execution of these various processes by the microprocessor 4 to be scheduled in time. By virtue thereof, all the processes are executed in alternation by the same microprocessor 4. Likewise, the cache memory 6 is accessible and usable by all the simultaneously executed processes. In particular, to increase the efficiency and speed of execution of each of the processes, each of them may read and write words to any location on the medium 7. In other words, the medium 7 is not divided into a plurality of partitions each of which is reserved for use by a single particular process.

Execution of a plurality of processes by a microprocessor is well known to those skilled in the art. Thus, only access to and management of the cache memory 6 will be described in greater detail below.

In a step 100, a request to read a word is received by the unit 14. This request is issued by a process executed by the microprocessor 4. This read request notably contains the address @r of the word to be read and therefore the tag $T_r$, the address $@_{Si,r}$ and the index $d_r$. It also contains the identifier $Id_u$ of the process that issued this request and the state of the marker MP.

In a step 102, the tag $T_r$, the address $@_{Si,r}$, the index $d_r$, the identifier $Id_u$ and the marker MP are stored in the registers $T_r$, $@_{Si,r}$, $d_r$, $Id_u$ and MP of the managing unit 14, respectively.

In a step 104, the generator 40 then generates the four values $Iw_{1,r}$, $Iw_{2,r}$, $Iw_{3,r}$ and $Iw_{4,r}$ of the indices $Iw_1$, $Iw_2$, $Iw_3$ and $Iw_4$, respectively.

To do this, in an operation 106, the circuit 42 checks whether the received marker MP is in its inactive state. If so, the method continues with an operation 108. If not, the method continues with an operation 110.

In operation 108, the circuit 42 constructs four intermediate values $I'w_{1,r}$, $I'w_{2,r}$, $I'w_{3,r}$ and $I'w_{4,r}$ as described with reference to FIG. 4.

Operation 110 is identical to operation 108 except that the bits of the identifier $Id_u$ are replaced by a predetermined constant value that is identical for all the processes executed by the computer 2. For example, the bits of the identifier $Id_u$ are all set to zero. In this case, the generated intermediate values $I'w_{1,r}$, $I'w_{2,r}$, $I'w_{3,r}$ and $I'w_{4,r}$ do not vary depending on the identifier $Id_u$. Therefore, if two executed processes have the same address space, and the request containing the address @r is issued by one of these processes, the intermediate values $I'w_{1,r}$, $I'w_{2,r}$, $I'w_{3,r}$ and $I'w_{4,r}$ will be identical. Thus, as will be understood on reading the rest of this description, the set $S_{i,r}$ is the same for these two processes since the tables $T_j$ are the same for all the processes. This therefore allows these two processes to share a word stored in the cache memory 6.

At the end of operation 108 or at the end of operation 110, in an operation 112, the circuit 44 uses the tables $T_1$ to $T_4$ to convert the intermediate values $I'w_{1,r}$, $I'w_{2,r}$, $I'w_{3,r}$ and $I'w_{4,r}$ generated by the circuit 42 into final values $Iw_{1,r}$, $Iw_{2,r}$, $Iw_{3,r}$ and $Iw_{4,r}$.

Operation of the circuit 44 will be explained in the particular case of conversion of an intermediate value $I'w_{j,r}$ into a final value $Iw_{j,r}$ by means of table $T_j$. Everything described in this particular case is applied for each of the values of the index "j" between 1 and 4.

The circuit 44 selects, from table $T_j$, the cell $C_{x,1,j}$ that is located on the line the number of which is equal to the value $I'w_{j,r}$. The final value $Iw_{j,r}$ is then set equal to the value contained in the cell $C_{x,1,j}$ thus selected. For example, with reference to the content of the table $T_j$ shown in FIG. 3, the cell $C_{x,1,j}$ thus selected contains the final value $Iw_{j,r}$.

Next, in a step 120, the controller 60 selects, from the medium 7, the set $S_{i,r}$ of W lines $L_{i,j}$ located at the address $@_{Si,r}$. This set $S_{i,r}$ is formed by the W lines identified by the W final values $Iw_{j,r}$ obtained at the end of step 104. It will be recalled that each value $Iw_{j,r}$ of the index $Iw_j$ points to one respective line in table $T_j$. Typically, the line identified by the index $Iw_j$ is the line the line number of which is equal to the value $Iw_{j,r}$.

In a step 122, the comparator 56 processes, one after another, the W lines selected at the end of step 120. Successively, for each of the lines $L_{i,j}$ thus selected, the comparator 56 compares the tag $T_{i,j}$ of this line with the received tag $T_r$. The comparator 56 transmits a hit signal to the controller 60 only if, for the line $L_{i,j}$ currently processed, the tags $T_{i,j}$ and $T_r$ are identical. In all other cases, the comparator 56 transmits a miss signal to the controller 60.

In parallel, in a step 124, the extractor 62 reads, from field $D_{i,j}$ of the line $L_{i,j}$ currently processed by the comparator 56, the word located in the position identified by the received index $d_r$.

In response to a hit signal, in a step 126, the controller 60 transmits, to the microprocessor 4, the word extracted in step 124 and the method returns to step 100 to process the next read request.

If the comparator 56 generated a miss signal for the W processed lines $L_{i,j}$, the controller 60 triggers a cache miss. The method then continues with a step 130 of retrieving the sought word from a memory of higher rank.

Step 130 begins with an operation 132 of selecting the line to be removed from the W current lines of the set $S_{i,r}$. To do this, the controller 60 selects as a priority a line of the set $S_{i,r}$ the bit $Bv_{i,j}$ of which indicates that it is invalid. To this end, for each line $L_{i,j}$ of the set $S_{i,r}$, the controller 60 reads the bit $Bv_{i,j}$ associated with this line $L_{i,j}$ by the table $T_j$. More precisely, the controller 60 reads the bit $Bv_{i,j}$ contained in the cell $C_{x,3,j}$ of the line of the table $T_j$ the cell $C_{x,1,j}$ of which contains the value $Iw_{j,r}$ generated in step 104.

If a single line $L_{i,j}$ of the set $S_{i,r}$ is associated with a bit $Bv_{i,j}$ that indicates that this line is invalid, then it is this line that is selected to be removed. Otherwise, if a plurality of lines of the set $S_{i,r}$ are associated with bits $Bv_{i,j}$ that indicate that they are invalid, then any of these lines is selected. Lastly, if all the lines of the set $S_{i,r}$ are valid, i.e. they are all associated with validity bits that indicate that they are valid, then any of these lines is selected to be removed.

Next, in an operation 134, the controller 60 checks the state of the dirty bit associated with the selected line to be removed. To this end, if the selected line to be removed is line $L_{i,j}$, the controller 60 reads the bit $Bs_{i,j}$ associated with this line $L_{i,j}$ by the table $T_j$. More precisely, the controller 60 reads the bit $Bs_{i,j}$ contained in cell $C_{x,4,j}$ of the line of the table $T_j$ the cell $C_{x,1,j}$ of which contains the value $Iw_{j,r}$ generated in step 104, the subscript j being the subscript of the way $W_j$ that contains the line $L_{i,j}$ selected in operation 132.

If, in operation 134, the bit $Bs_{i,j}$ indicates that this line has been modified since it was stored on the medium 7, then, in an operation 136, the content of its field $D_{i,j}$ is saved in a memory of higher rank, i.e. here in the memory 8.

Next, directly after operation 134 if the bit $Bs_{i,j}$ of the line to be removed is equal to zero or at the end of operation 136, in an operation 140, the controller 60 compares the value of the counter $CNT_{i,j}$ to a predetermined threshold SA. The counter $CNT_{i,j}$ is the one associated with the line $L_{i,j}$ to be removed by the table $T_j$. To do this, the controller 60 reads the value contained in cell $C_{x,2,j}$ of the line of the table $T_j$ the cell $C_{x,1,j}$ of which contains the value $Iw_{j,r}$ generated in step 104, the subscript j being the subscript of the way $W_j$ that contains the line $L_{i,j}$ selected in operation 132.

If the value of the counter $CNT_{i,j}$ is lower than the threshold SA, then, in an operation 142, the line $L_{i,j}$ to be removed is replaced, on the medium 7, by a new line loaded from the memory of higher rank and containing the sought word. To do this, the new line is stored on the medium 7 in place of the line to be removed.

Next, in an operation 144, the counter $CNT_{i,j}$ is incremented by a predetermined increment, for example an increment equal to one. The bits $Bv_{i,j}$ and $Bs_{i,j}$ are also set to "1" and "0", respectively.

If the value of the counter $CNT_{i,j}$ is greater than or equal to the threshold SA, at the end of operation 140, the method continues with an operation 150.

In operation 150, a new line of the way $W_j$, which line is different from the line $L_{i,j}$, to be removed, is selected. For example, to this end, the generator 48 is used to randomly draw a number comprised between 1 and s and different from the current value $Iw_{j,r}$ of the index $Iw_j$. Below, the value thus drawn is denoted $Iw_j,k$. For example, as illustrated in FIG. 3, this value $Iw_j,k$ corresponds to a line $L_{k,j}$ of the way $W_j$, where the value of the subscript k is different from the value of the subscript i. The line $L_{k,j}$ is associated, by the table $T_j$, with the counter $CNT_{k,j}$ and with the bits $Bv_{k,j}$ and $Bs_{k,j}$.

In an operation 152, the controller 60 permutates, in table $T_j$, the contents of the lines containing the values $Iw_{j,r}$ and $Iw_j,k$ of the index $Iw_j$. In operation 152, only these two lines of table $T_j$ are permutated and all other indirection tables remain unchanged. At the end of operation 152, the cells of table $T_j$ located on the line the number of which is equal to $I'w_{j,r}$ contain the values $Iw_j,k$, $CNT_{k,j}$, $Bv_{k,j}$ and $Bs_{k,j}$, respectively. The cells of the table $T_j$ located on the line the number of which is equal to $I'w_{j,k}$ contain the values $Iw_{j,r}$, $CNT_{i,j}$, $Bv_{i,j}$ and $Bs_{i,j}$, respectively. Thus, now, following this modification of the table $T_j$, for a read request containing the same address @r, the same identifier $Id_u$ and the same marker MP, the value of the index $Iw_j$ is equal to $Iw_j,k$ and is no longer equal to $Iw_{j,r}$. In other words, after operation 152, the set $S_{i,r}$ contains the line $L_{k,j}$ instead of the line $L_{i,j}$.

Next, in an operation 154, the counters $CNT_{k,j}$ and $CNT_{i,j}$ are reset. To do this, here, they are set to zero in table $T_j$. In addition, the validity bit $Bv_{i,j}$ is set to zero to indicate that line $L_{i,j}$ is now invalid.

Lastly, in an operation 156, the line $L_{k,j}$ to be removed is replaced, on the medium 7, by a new line loaded from the memory of higher rank and containing the sought word. To do this, if the bit $Bs_{k,j}$ associated with the line $L_{k,j}$ is equal to "1", then the content of the field $D_{k,j}$ is first saved to the memory of higher rank. Next, the new line is stored on the medium 7 in place of the line $L_{k,j}$. The bits $Bv_{k,j}$ and $Bs_{k,j}$ are then set to "1" and "0", respectively.

At the end of step 130, in a step 160, the sought word is read in the cache memory from the new line loaded in operation 142 or 156.

In the case of a request to write a word to the cache memory 6, everything described above applies but, instead of reading the sought word from the cache memory, the received value $V_r$ is written to the sought word.

SECTION III: VARIANTS

Variants of the Method:

In operation 132, other methods of selecting the line to be removed are possible. For example, in one particularly simple variant, the line to be removed is chosen without taking into account the state of the validity bits $Bv_{i,j}$. For example, the line to be removed is chosen randomly or pseudo-randomly from the W lines of the set $S_{i,r}$. In this case, the validity bit $Bv_{i,j}$ may be omitted.

Permutation of two lines of the table $T_j$ during execution of the process may be triggered differently. In particular, counters $CNT_{i,j}$ need not be used. For example, as a variant, permutation of the two values $Iw_{i,j}$ and $Iw_{k,j}$ of the index $Iw_j$ in table $T_j$ is automatically triggered randomly in response to a cache miss. For example, operation 140 is replaced by an operation in which a number is randomly drawn. If this number is greater than or equal to the threshold SA, operations 150, 152 and 156 are executed. Otherwise, operation 142 is executed. In this case, operation 144 of incrementing the counter $CNT_{i,j}$ and operation 154 of resetting the counters are omitted. In another embodiment, the unit 14 includes a timer that counts down a duration T44. Each time the duration T44 elapses, in response to the next cache miss, permutation of two lines of table $T_j$ is triggered. Thus, in this case, the time interval between two permutations of two lines of the tables $T_j$ is independent of the number of cache misses. In another embodiment, it is an event other than a cache miss that is counted to trigger permutation of two lines of table $T_j$. For example, execution of operations 150 and 152 is systematically triggered after a predetermined number of hits or on the basis of any other criterion. In another simplified variant, execution of operations 150, 152 to 156 is triggered each time a cache miss occurs. In this case, operations 140, 142, 144 and 154 are omitted.

In operations 142 and 156, instead of copying only the line of the memory of higher rank that contains the sought word to the cache memory 6, W lines are copied from the memory of higher rank to the W lines of the set $S_{i,r}$. Typically, these W lines are adjacent, in the memory of higher rank, to the line that contains the sought word.

In operation 150, selection of the new line $L_{k,j}$ from table $T_j$ is not necessarily carried out randomly or pseudo-randomly. For example, as a variant, the new line is selected by implementing a deterministic function that, with each value of an input variable, associates a respective determined value $Iw_{k,j}$ of the index $Iw_j$. The value of the input variable is determined from one or more values known at the moment when the new line must be selected. For example, it may be a value constructed from the values contained in the received read or write request. However, other values known to unit 14 than those contained in the read or write request may be used for this purpose.

In operation 144, other values are possible for the increment of the counter $CNT_{i,j}$. In particular, the increment may also be negative. In this case, the initial value of the counter $CNT_{i,j}$ assigned to this counter in operation 154 is a value greater than the threshold SA.

Variants of the Generator of the Values of Index $Iw_j$:

The tag $T_r$ may be constructed from the physical $@r_r$ address of the sought word or from the virtual $@r_v$ address of this sought word. This is because it is always possible to convert a physical address into a virtual address and vice versa. This is typically a task performed by the MMU (acronym of Memory Management Unit). Thus, if at the moment when the unit 14 receives the request to read or write a word, the physical address $@r_r$ is known, then the unit 14 extracts the address $@_{Si,r}$, the tag $T_r$ and the index $d_r$ from this address $@r_r$. This situation is encountered almost systematically if the cache memory 6 is an L2 cache memory or a cache memory of level higher than L2. In the case where the cache memory 6 is an L1 cache memory, it may be that at the moment when the unit 14 receives this request, only the virtual address $@r_v$ is available. In this case, the generator 40 extracts the tag $T_r$ and the address $@_{Si,r}$ from the address $@r_v$. Thus, in this case, the values $Iw_{j,r}$ are generated from the virtual address $@r_v$ and not from the physical address $@r_r$. In the meantime, the physical address $@r_r$ will become available and, notably, steps 122, 124 and 126 will be carried out using this physical address and not the virtual address of the word to be read or written.

The generator 40 may take into account other additional information contained in the read or write request when generating the values of the indices $Iw_j$. For example, the generator may in addition use the index $d_r$.

However, the generator 40 may also take into account fewer pieces of information than those described above when generating the values of the indices $Iw_j$. For example, systematically, the tag $T_r$ is not taken into account when generating the values $Iw_{j,r}$ of the indices $Iw_j$. In another very simplified variant, the process identifiers $Id_u$ are omitted and are never used to construct the values $Iw_{j,r}$ of the line indices $Iw_j$.

In step 110, to share the sought word between a plurality of processes, if necessary, the tag $T_r$ is replaced by a constant value that is identical for all the processes. This may be necessary if the tag $T_r$ is extracted from the virtual address $@r_v$ and not from the physical address $@r_r$ of the sought word.

In another embodiment, the shared memory marker MP is omitted. In this case, it is not possible to share a word stored in the cache memory between a plurality of processes simultaneously executed by the computer. To do this, typically, the identifier $Id_u$ of each executed process is systematically used to generate the values of the indices $Iw_j$.

Other embodiments of the cryptographic circuit 42 are possible. For example, the circuit 42 may execute a cryptographic function that is more complex than the one described above to generate the intermediate values $I'w_{j,r}$. For example, the cryptographic function executed by the circuit 42 may be identical to the IDF function used in the Scattercache solution. In contrast, preferably, the cryptographic function may also be simpler than the one described above. For example, the permutator 72 or the substitution circuits 76 to 79 are omitted.

The key k may also be omitted. In this case, the generated values $Iw_{j,r}$ are independent of this key k.

In one very simplified variant, the cryptographic circuit 42 is omitted. For example, in this case, the intermediate values $I'w_{j,r}$ are all set equal to the address $@_{Si,r}$.

The number of indirection tables used is not necessarily equal to W. For example, to save memory, as a variant, the number of indirection tables is less than W. In this case, a plurality of indices $Iw_j$ are associated with the same indirection table $T_k$ common to these indices $Iw_1$. Consequently, the same table $T_k$ is used, for a plurality of different indices $Iw_j$, to convert the intermediate value $I'w_{j,r}$ of this index $Iw_i$ into a corresponding final value $Iw_{j,r}$. This still makes it possible to obtain various values $Iw_{j,r}$ for these various indices $Iw_j$ because the intermediate values $I'w_{j,r}$ are different from one another. In an extreme case, a single indirection table associated with all the indices $Iw_j$ is used.

Other Variants:

As a variant, the counters $CNT_{i,j}$ and/or the dirty bits $Bs_{i,j}$ and/or the validity bits $Bv_{i,j}$ are stored directly on the medium 7 and not in the indirection tables $T_j$. Typically, in this case, the counter $CNT_{i,j}$, the bit $Bs_{i,j}$ and the bit $Bv_{i,j}$ associated with line $L_{i,j}$ are stored directly in this line on the medium 7 at predefined locations distinct from the one or more words contained in the same line $L_{i,j}$.

Here, the expressions "validity bit" and "dirty bit" each designate information that can be encoded using a single bit. However, as a variant, although the information may be encoded using a single bit, it is possible to encode it on a plurality of bits.

As a variant, the value of the threshold SA is dynamically adjusted by the computer during execution of the process. For example, the calculator reads the current cache-miss rate. Should the current cache-miss rate cross a threshold, then the value of the threshold SA is lowered so as to more frequently permutate two values of the indirection table.

The cache memory may be divided into various cache-memory levels conventionally called "L1 cache", "L2 cache", "L3 cache", etc. The access times of these various levels increase from the L1 cache to the L3 cache. In addition, these various cache-memory levels are not necessarily embedded on the same die. For example, the L1 cache may be implemented inside the microprocessor 4 while the higher levels are implemented outside the microprocessor 4. The methods for managing a cache memory described here are applicable to each of these cache-memory levels. Preferably, the methods described here are applied to each of these levels.

The number W of way $W_j$ may be equal to one, two or three or indeed be greater than four or six.

The teaching given here also applies to the case of direct-mapped cache memories. In this case, the number W is equal to one and the address $@_{Si,r}$ corresponds to a single line of the cache memory.

The mass storage may be located outside the computer and connected to this computer by means of a bus or a data transmission network. Likewise, the main memory may also be mechanically located outside the computer and connected to this computer by a bus or a data transmission network.

What has been described here applies to other word and line lengths.

In another embodiment, the index $d_r$ is omitted from the request to read a word from the cache memory. In this case, in the case of a match between the tag $T_r$ and one of the tags $T_{i,j}$, the cache memory 6 sends the complete field $D_{i,j}$ to the microprocessor 4. It is then the microprocessor 4 that itself extracts the desired word from the received field $D_{i,j}$.

Instead of comprising a single microprocessor, the electronic computer may comprise a plurality of microprocessors each capable of accessing the cache memory 6. In this case, each process executed in parallel with the others is, for example, executed by its own microprocessor. What has been described here in the particular case where the various processes are executed, in parallel, by the same microprocessor 4 works in the same way in the case of such an electronic computer equipped with a plurality of microprocessors.

A plurality of the embodiments described here may be combined together to obtain a new embodiment.

SECTION III: ADVANTAGES OF THE EMBODIMENTS

Using at least one indirection table $T_j$ to generate the values $Iw_{j,r}$ of the indices $Iw_j$ and permutating, in response to a cache miss, only two values of this indirection table makes it possible to modify, little by little and during the execution of the process, the spatial distribution of the lines of the cache memory 6 used by this process. Unlike a change of the key k or of the identifier SDID in the Scattercache solution, the spatial randomization of the lines of the cache memory 6 used by the process is not static and varies gradually. Thus, the slowdown in execution of the process due to a very large number of cache misses following the change of the key k or identifier SDID does not occur. The method for managing a cache memory described here thus allows the IDF function described in the Scattercache solution to be simplified without however compromising the security of the method. Specifically, in the method described here, spatial randomization is already obtained via the permutations of the values in the indirection tables $T_j$. Therefore, it is not in addition necessary to use a complicated cryptographic function to produce the circuit 42. The method described here also allows the advantages of the method described in the Scattercache solution to be preserved. In particular, in the case of an associative cache memory, where W is greater than one, the lines corresponding to a given set address $@_{Si,r}$ are not located next to one another in the cache memory and are not necessarily located in the same location in each of the ways $W_j$. Thus, this makes it possible to preserve a good spatial randomization of these lines inside the cache memory while adding temporal randomization. Here, "temporal randomization" designates frequently changing the spatial randomization.

Triggering permutation of the two values $Iw_{j,r}$ and $Iw_{j,k}$ of the index $Iw_j$ in the indirection table $T_j$ only when the value of the counter $CNT_{i,j}$ associated with the line to be removed crosses the threshold SA allows the frequency at which the permutations occur during execution of the process to be adjusted in a simple fashion. Specifically, to do this, it is sufficient to modify the value of the threshold SA.

Recording the counter $CNT_{i,j}$, the bit $Bs_{i,j}$ or the validity bit $Bv_{i,j}$ in the indirection table $T_j$ rather than on the medium 7 allows faster access to this information, which speeds up execution of the process.

Using the process identifier $Id_u$ to generate the values of the indices $Iw_j$ allows lines of the cache memory to be used that differ depending on the process. Thus, it is difficult for an attacking process executed by the computer 2 to access simply the lines used by another simultaneously executed process. In addition, to achieve this result, it is not necessary to partition the cache memory between the various executed processes.

Not taking into account the process identifier $Id_u$ when generating the values of the W indices $Iw_j$ when the shared memory marker MP is in the active state allows a word stored in the cache memory to be shared between a plurality of processes.

Random or pseudo-random selection of the new line $L_{k,j}$ makes it possible to make the location of this new line in the cache memory more unpredictable. This therefore makes it more complicated to identify the cache-memory lines used by an attacked process.

Systematically switching the validity bit $Bv_{i,j}$ to the "invalid" state after the line $L_{i,j}$ has been replaced by the line $L_{k,j}$ makes it possible to remove those lines that are no longer being used as a priority, and therefore to limit the number of times a line must be saved to a memory of higher rank.

Using the key k stored in the memory 38 of the unit 14 for managing the cache memory to select a cell $C_{x,1,j}$ in table $T_j$ makes it possible to reinforce the robustness of the method. Specifically, the key k is not known to any of the processes executed by the computer 2, and hence it is very difficult to predict the location where the words are stored in the cache memory 6. In addition, the key k is stored in a memory 38 that is not accessible by the executed processes.

The invention claimed is:

1. A method for managing a cache memory of an electronic computer, this method comprising following steps during execution by this electronic computer of a process that must process a word:

(a) receiving a request containing an address of the word to be read or written, the address comprising:
   a received line tag,
   a received set address, this received set address belonging to a first set of s different values, where the number s is an integer greater than two, then b) generating, depending on the set address received in step a), a respective first value for each line index of a group of W different line indices, where W is a predetermined integer greater than or equal to one, each line index pointing to one respective way of s different lines of the cache memory and the respective first value uniquely identifying a single line of the way to which the line index points, each line identified by the respective first value of a line index comprising a pre-stored line tag, then c) comparing the received line tag to the line tags of the lines identified by the first values of the W line indices generated in step b), to determine whether any of these line tags corresponds to the received line tag, d) when none of the line tags compared in step c) corresponds to the received line tag, triggering a cache miss and retrieving the word from a memory of higher rank, and when, conversely, one of the line tags compared in step c) corresponds to the received line tag, reading from or writing to the cache memory the word inside the line containing the line tag that corresponds to the received line tag, wherein:

step b) comprises, for each of the W line indices, selecting, depending on the set address received in step a), a first cell in a first column of a pre-stored indirection table associated with this line index and using, as first value generated for this line index, the value contained in this first cell, in step d), in response to triggering of a cache miss, the method comprises the following operations:

d1) storing the word retrieved from the memory of higher rank in a new line identified by a second line-index value that points to the way containing this new line, this second value being different from the first value of this line index generated in step b) and being contained in a second cell of the first column of the indirection table associated with this line index, this second cell being different from the first cell, and d2) permutating, in the first column of the indirection table associated with the line index that points to the way containing the new line, only values contained in the first and second cells, so that after this permutation the first cell contains the second value and the second cell contains the first value.

2. The method according to claim 1, wherein, in step d), in response to triggering of a cache miss, the method comprises:

selecting a line to be removed among the W lines identified by the first values of the W line indices generated in step b), then comparing a counter associated with the selected line to be removed, to a predetermined threshold, and when this comparison indicates that the value of this counter has crossed the predetermined threshold, executing operations d1) and d2) and resetting this counter and, conversely, when this comparison indicates that the value of this counter has not yet crossed the predetermined threshold, storing the word retrieved from the memory of higher rank in the selected line to be removed and incrementing the counter associated with this line to be removed.

3. The method according to claim 2, wherein the counter is stored in a second column of the indirection table associated with the line index that points to the way containing the line to be removed.

4. The method according to claim 1, wherein the method comprises:

using a dirty bit associated with each line of the cache memory to determine whether, before removing that line from the cache memory, the word or words contained in that line must first be saved in a memory of higher rank, and storing the dirty bit associated with each line of the cache memory in a third column of the indirection table associated with the line index that points to the way containing that line.

5. The method according to claim 1, wherein the method comprises:

using a validity bit associated with each line of the cache memory to determine whether that line must be selected as a priority to be removed from the cache memory, and storing the validity bit associated with each line of the cache memory in a fourth column of the indirection table associated with the line index that points to the way containing that line.

6. The method according to claim 1, wherein:

in step a), the received request also comprises a received process identifier that distinguishes the process that issued this request from all the other processes simultaneously executed by the electronic computer, in step b), the first values of the W line indices are also generated depending on the process identifier received in step a).

7. The method according to claim 6, wherein:

in step a), the received request also comprises a shared memory marker that indicates whether or not the word to be read or written is shared with other processes simultaneously executed by the electronic computer, and in step b), when the shared memory marker indicates that the word to be read or written is not shared with other processes simultaneously executed by the electronic computer, the first values of the W line indices are also generated depending on the process identifier received in step a) and, otherwise, when the shared memory marker indicates that the word to be read or written is shared with other processes simultaneously executed by the electronic computer, the first values of the W line indices are generated without taking into account the process identifier received in step a).

8. The method according to claim 1, wherein operation d1) comprises randomly or pseudo-randomly selecting the new line from lines of a way that are different from the line identified by the first value of the line index that points to that way.

9. The method according to claim 1, wherein the method comprises:

using a validity bit associated with each line of the cache memory to determine whether that line must be selected as a priority to be removed from the cache memory, this validity bit being switchable between:

an "invalid" state in which it indicates that this line must be selected as a priority to be removed from the cache memory, and a "valid" state in which it indicates that this line must not be selected as a priority to be removed from the cache memory, and in response to execution of operation d2), the validity bit associated with the line of the cache memory identified by the first value of the line index that points to the way containing the new line is systematically set to the "invalid" state.

10. The method according to claim 1, wherein W is greater than or equal to two.

11. The method according to claim 10, wherein each line index is associated with its own indirection table.

12. The method according to claim 1, wherein step b) comprises, for each line index:

constructing an intermediate value of this line index from the set address received in step a) and a secret cryptographic key contained in a non-volatile memory inaccessible by the processes executed by the computer, then selecting, depending on the set address received in step a), a first cell in a first column of the pre-stored indirection table associated with this line index, this consisting in selecting the cell of this indirection table that is located on the line of this indirection table the index of which is equal to the intermediate value constructed for this line index.

13. A hardware unit for managing a cache memory of an electronic computer, this hardware unit being configured to carry out following steps during execution by this electronic computer of a process that must process a word:
  (a) receiving a request containing an address of the word to be read or written, the address comprising:
  a received line tag,
  a received set address, this received set address belonging to a first set of s different values, where the number s is an integer greater than two, then
  b) generating, depending on the set address received in step a), a respective first value for each line index of a group of W different line indices, where W is a predetermined integer greater than or equal to one, each line index pointing to one respective way of s different lines of the cache memory and the respective first value uniquely identifying a single line of the way to which the line index points, each line identified by the respective first value of a line index comprising a pre-stored line tag, then
  c) comparing the received line tag to the line tags of the lines identified by the first values of the W line indices generated in step b), to determine whether any of these line tags corresponds to the received line tag,
  d) when none of the line tags compared in step c) corresponds to the received line tag, triggering a cache miss and retrieving the word from a memory of higher rank, and when, conversely, one of the line tags compared in step c) corresponds to the received line tag, reading from or writing to the cache memory the word inside the line containing the line tag that corresponds to the received line tag, wherein the managing hardware unit is also configured to:
  in step b), for each of the W line indices, select, depending on the set address received in step a), a first cell in a first column of a pre-stored indirection table associated with this line index and use, as first value generated for this line index, the value contained in this first cell,
  in step d), in response to triggering of a cache miss, execute the following operations:
    d1) storing the word retrieved from the memory of higher rank in a new line identified by a second line-index value that points to the way containing this new line, this second value being different from the first value of this line index generated in step b) and being contained in a second cell of the first column of the indirection table associated with this line index, this second cell being different from the first cell, and
    d2) permutating, in the first column of the indirection table associated with the line index that points to the way containing the new line, only values contained in the first and second cells, so that after this permutation the first cell contains the second value and the second cell contains the first value.

\* \* \* \* \*